Nov. 23, 1948.  A. E. BAAK  2,454,588
CONTROL APPARATUS
Filed April 23, 1943  3 Sheets-Sheet 1
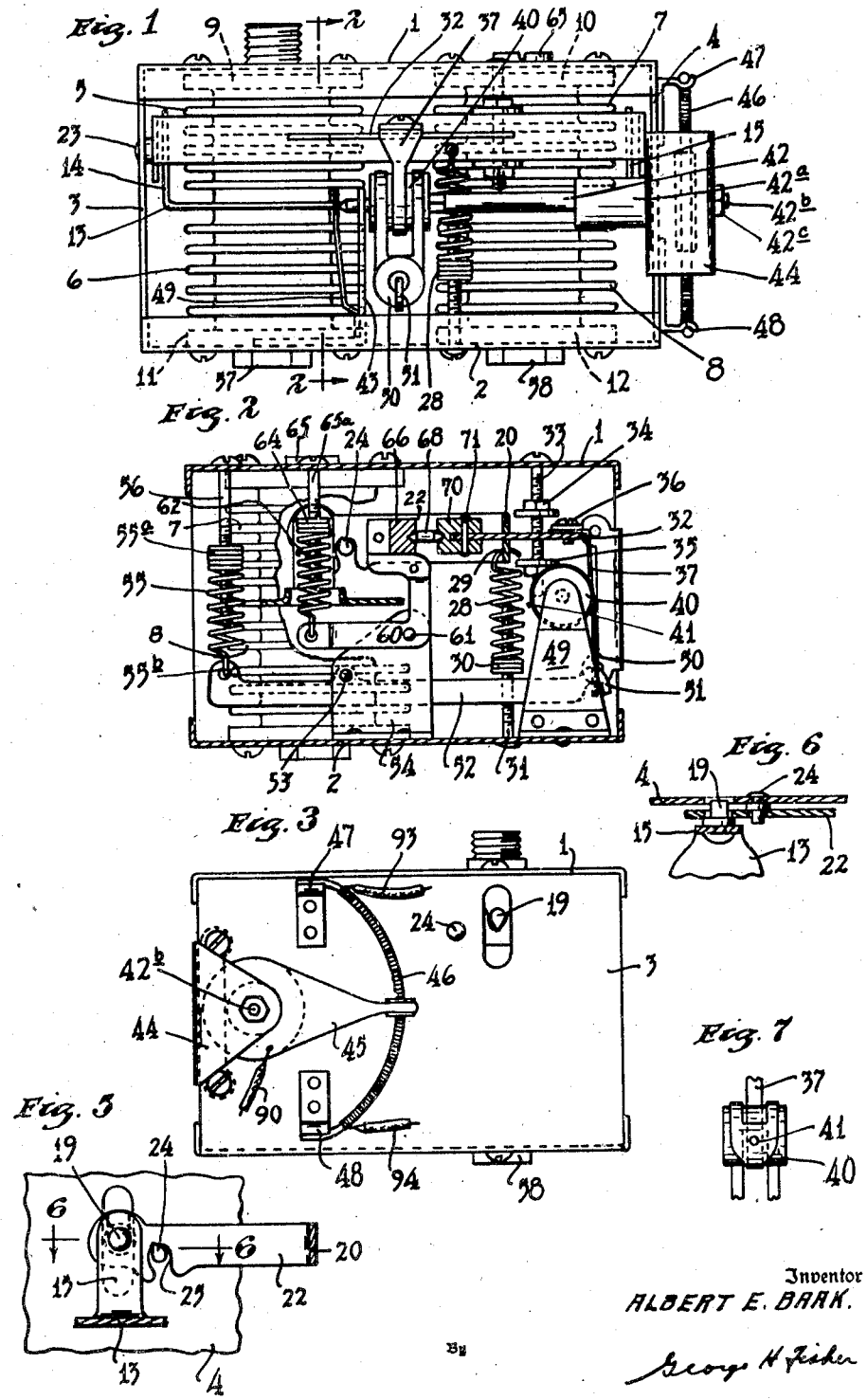
Inventor
ALBERT E. BAAK.
By George H Fisher
Attorney Nov. 23, 1948.　　　A. E. BAAK　　　2,454,588
CONTROL APPARATUS
Filed April 23, 1943　　　3 Sheets-Sheet 2
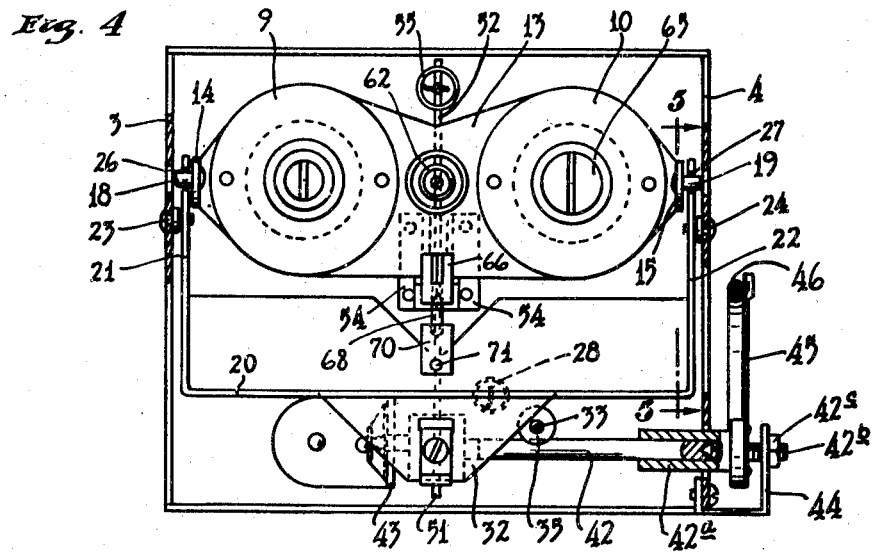
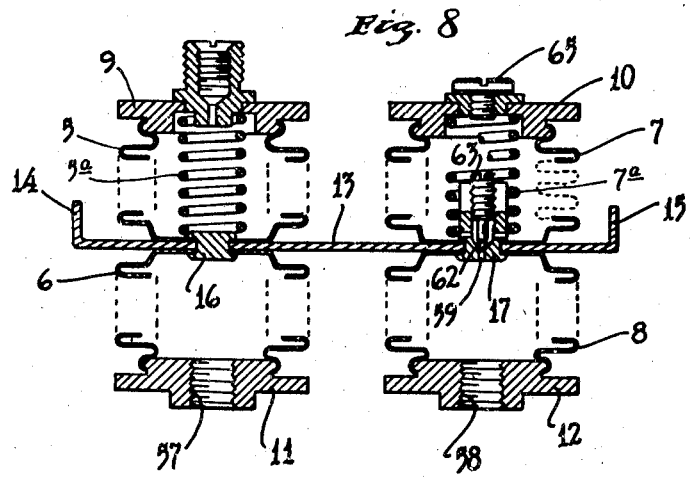
Inventor
ALBERT E. BAAK
George H Fisher
Attorney

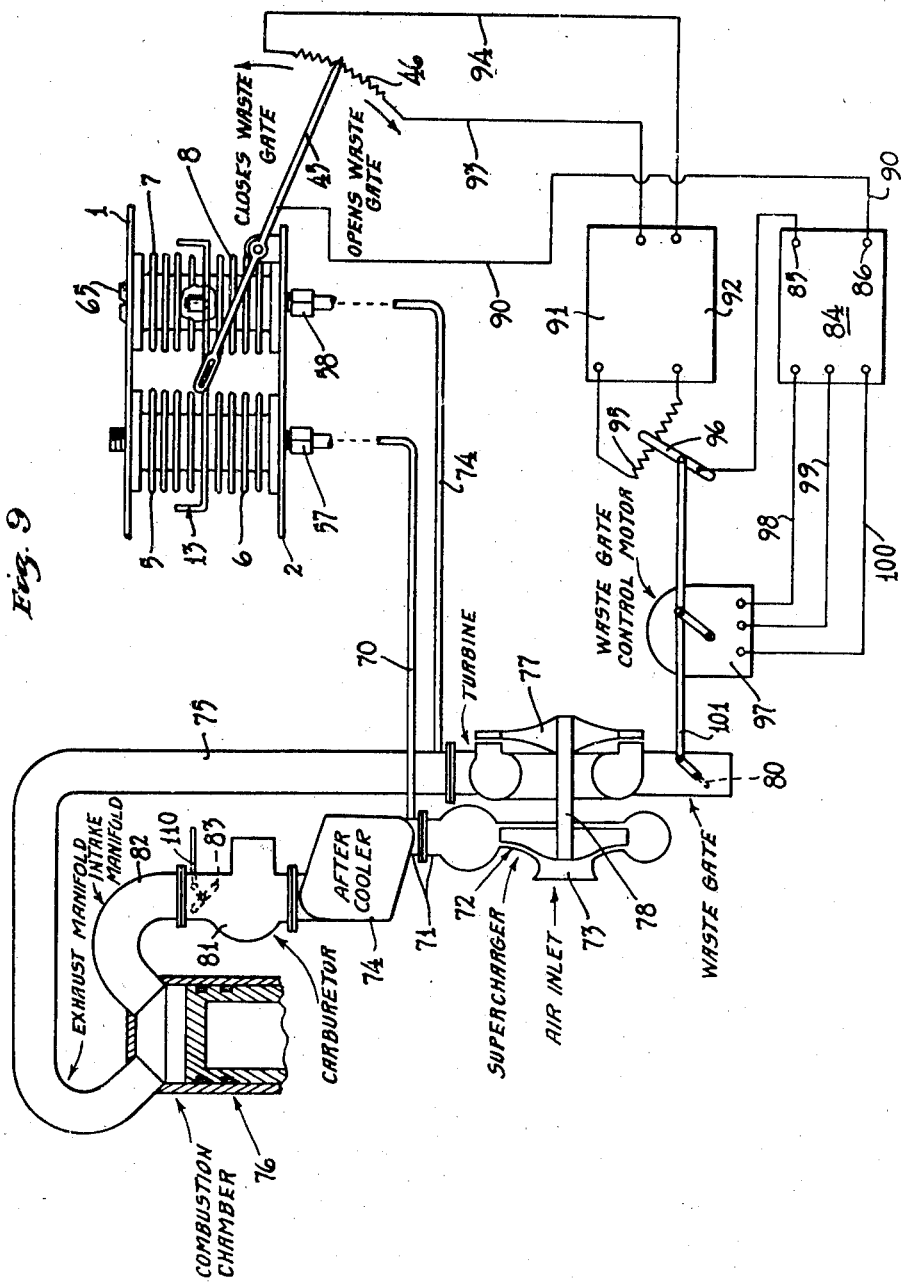

Patented Nov. 23, 1948

2,454,588

UNITED STATES PATENT OFFICE 2,454,588

CONTROL APPARATUS

Albert E. Baak, Los Angeles, Calif., assignor to Minneapolis-Honeywell Regulator Company, Minneapolis, Minn., a corporation of Delaware Application April 23, 1943, Serial No. 484,226

8 Claims. (Cl. 230—5)

The present invention relates to control apparatus, and particularly to control apparatus of the type wherein a motor driven device is positioned in accordance with the resultant of a plurality of controlling conditions. While my invention is of particular utility when used in a system for controlling the pressure of the air supplied to the intake manifold of an internal combustion engine, as disclosed in the present specification, it will be readily understood that my invention is capable of many other applications, and that its utility is not limited to this particular system.

Internal combustion engines used on aircraft are sometimes provided with a compressor, usually termed a supercharger, which is driven by a turbine powered by the exhaust gases of the engine. The speed of the turbine, and hence the compression ratio of the compressor, is controlled by a device termed a waste gate, which is a valve or damper that by-passes part of the exhaust gases from the exhaust manifold directly to the atmosphere instead of directing them through the turbine. In order to secure optimum operating conditions for the engine, it is usually desirable to maintain the intake manifold pressure of the engine at a substantially constant value. The intake manifold pressure may be varied either by adjusting the position of the throttle or by adjusting the position of the waste gate associated with the turbine which drives the supercharger.

In the co-pending application of Hubert T. Sparrow and Albert E. Baak, Serial No. 476,798, filed February 22, 1943, there is disclosed a system for controlling the waste gate of a turbine driven supercharger in accordance with the pressure of the air discharged by the supercharger. In that system, an electrical motor drives the waste gate, and this motor is controlled in accordance with the unbalance of an electrical network which includes two variable impedance devices. One of these variable impedance devices is operated in accordance with the pressure of the air discharged by the supercharger. The other is operated in accordance with the rate of change of the pressure in the exhaust manifold of the engine.

It is an object of the present invention to provide an improved and simplified control system of the type disclosed in the co-pending joint application of Sparrow and Baak, previously referred to, wherein a single variable impedance device is operated in accordance with the resultant of a first control effect dependent upon the pressure of the air discharged by the supercharger and a second control effect dependent upon the rate of change of the pressure in the exhaust manifold.

Another object of this invention is to provide an improved electrical control system in which a single controller is operated in accordance with the resultant of a plurality of controlling conditions.

A further object of the present invention is to provide an improved control device, of the type in which a control element is operated in accordance with the resultant of a plurality of variable control forces.

A further object of the present invention is to provide a control device in which two pairs of bellows act in parallel on a beam, and a lever moved by the beam operates a control device.

Another object of the present invention is to provide a control device of the type described, wherein one of the two pairs of bellows produces a force variable in accordance with the changes in an absolute pressure condition, and the other pair of bellows produces a force varying with the rate of change of a second pressure condition.

Another object of the present invention is to provide improved means for controlling the flexibility of a mechanical system including a plurality of flexible bellows, in order to control the differential between the forces required to hold the system in two different positions.

Another object of the present invention is to provide an improved and more compact control device in which a single control element is positioned in accordance with the resultant of a plurality of controlling conditions.

Other objects and advantages of my invention will become apparent from a consideration of the appended specification, claims and drawing, in which Figure 1 is an elevational view of a control device embodying certain features of my invention.

Figure 2 is a sectional view taken along the lines 2—2 of Figure 1, looking in the direction of the arrows, with some of the parts removed for the sake of clarity, Figure 3 is an elevational view of the right end of the structure shown in Figure 1, Figure 4 is a plan view of the device shown in Figure 1 with the top of the casing removed, Figure 5 is a detail sectional view taken along the line 5—5 of Figure 4, looking in the direction of the arrows, Figure 6 is a sectional view taken along the line 6—6 of Figure 5, and looking in the direction of the arrows, Figure 7 is a view of a detail of the device shown in Figure 1, Figure 8 is a view showing the details of the mounting of the bellows in the device shown in Figure 1, and, Figure 9 is a somewhat diagrammatic illustration of the control device of Figure 1 applied to a system for controlling the pressure of the air supplied to the intake manifold of an internal combustion engine.

Referring to Figure 1, there are shown top and bottom supporting plates 1 and 2 fastened together by end plates 3 and 4. A first pair of resilient bellows 5 and 6 and a second pair of resilient bellows 7 and 8 are mounted between the supporting plates 1 and 2. Bellows 5 and 7 have fastened respectively thereto end members 9 and 10 as shown in Figure 8. The end members 9 and 10 are in turn fastened by bolts or other suitable means to the top plate 1 as indicated in Figure 1. The bellows 6 and 8 likewise have provided respectively end members 11 and 12 which are similarly fastened to the bottom plate 2.

Positioned intermediate the bellows 5 and 7 and the bellows 6 and 8 is a beam or plate 13 having upturned ears 14 and 15 provided at opposite ends thereof. The bellows 5 and 6 are secured to the plate 13 by a fastening member 16, while the bellows 7 and 8 are secured to the plate 13 by a fastening member 17 as shown in Figure 8. Pins 18 and 19 project outwardly from the upturned ears 14 and 15, respectively, as best shown in Figure 4. The lower surface of each of these pins is tapered to form a knife edge. These knife edges cooperate with similarly tapered notches in the upper surfaces of the extremities of the arms 21 and 22 of a U-shaped lever 20. Pins 23 and 24 are fixedly mounted on the end plates 3 and 4, respectively, and project inwardly therefrom. The upper surfaces of the pins 23 and 24 are tapered to form knife edges, and these knife edges cooperate with tapered notches 25 in the lower edges of the arms 21 and 22. The pin 24 and its cooperating notch 25 are shown in detail in Figure 5. The lever 20 is biased for movement in a clockwise direction around the pivot pins 23 and 24 by a tension spring 28 fastened to the lever 20 at 29, as shown in Figure 2.

The opposite end of the spring 28 is secured to a threaded nut 30 which may be adjustably positioned for varying the tension of the spring by an adjustment screw 31. Thus the arms 21 and 22 are held in engaging relation with the pins 18 and 19 respectively by the tension of the spring 28.

A plate 32 is carried by the arm 20. Affixed at the top of the supporting plate 1 and projecting downwardly therefrom is a screw 33 carrying stop nuts 34 and 35 which limit the movement of the plate 32 and thereby the movement of the lever 20.

Fastened at one edge of the plate 32 by a screw 36 is one end of a metal tape 37. Tape 37 extends around a roller 40 and is attached to the roller 40 by a pin 41 (see Fig. 7). The tape 37 has a wide portion extending downwardly, as viewed in Figures 1 and 7, from the roller 40. This wide portion is slotted to permit the passage of a narrower portion of tape 37 extending upwardly from roller 40.

The roller 40, as shown in Figure 1, is mounted on the squared portion of a shaft 42 so as to rotate therewith while being capable of axial adjustment lengthwise thereof. The shaft 42 is supported at one end by an upwardly extending bracket 43 mounted on the bottom plate 2 and supported at the opposite end by a bracket 44 mounted on the end plate 4 as shown in Figures 3 and 4. The shaft 42 projects into and is secured to an insulating sleeve 42a which in turn projects through the end plate 4 and has mounted at the outer end thereof a potentiometer arm 45 which is arranged for adjustment along a suitable resistance 46 mounted on brackets 47 and 48 as shown in Figure 3. The purpose of this resistance will be explained hereinafter.

A fixed bracket 44 has a pivot screw 42b threaded therein and locked in position by a nut 42c. The end screw 42b is pointed and extends into the cone shaped end of shaft 42 so as to act as a low friction pivot or bearing for the right end of such shaft.

Positioned at the opposite end of the shaft 42 is a spring blade 49 fixed at one end to the bracket 43 and biased so that its free end bears against the pointed left end of the shaft 42 so as to provide a low friction bearing. The bias or tension of spring blade 49 holds the right end of shaft 42 on the pointed end of screw 42b. Further, if it is desired to increase or decrease the tension between potentiometer arm 45 and resistance 46 it is only necessary to loosen locknut 42c and turn screw 42b in or out. The tension of spring blade 49 will permit such axial movement of rod 42. Also, as indicated above, such axial movement is permitted between roller 40 and the squared portion of shaft 42.

The lower end of the metal tape 37 previously described is fastened to a ring 50 which operably engages a hook 51 at the end of a lever 52 as shown in Figure 2. The lever 52 is pivoted on a pin 53 mounted on a pair of brackets 54 projecting upwardly from the bottom plate 2. A spring 55 is fastened at the other end 55b of the lever 52 in such a manner as to tend to bias the lever 52 in a clockwise direction about the pin 53 as shown in Figure 2. The spring 55 is adjustably fastened at one end to a nut 55a, carried by a screw 56. The position of nut 55a, and hence the tension in spring 55, may be adjusted by rotating screw 56. It will thus be seen that the spring 55 exerts a biasing force upon the lever 52 tending to move the tape 37 downwardly so as to rotate the roller 40 as viewed in Figure 2 in a clockwise direction and to move the lever 20 in a similar direction about the pivot 24. Thus it will be seen that both the biasing springs 28 and 55 tend to move the lever 20 about the pins 23 and 24 in a clockwise direction, while the spring 55 also functions to maintain the tape 37 under tension.

As indicated in Figures 1 and 8, suitable passages are provided, designated by the numerals 57 and 58, for connection of the interior of the pressure responsive bellows 6 and 8, respectively, to suitable pressure sources, as will be explained.

The bellows 6 is connected through the passage 57 to a source of pressure, which may be, as hereinafter illustrated in connection with Figure 9, the pressure of the air discharged by the compressor in the air induction system of an internal combustion engine. The purpose of bellows 5 is to compensate the bellows for variations in atmospheric pressure. To this end it is evacuated, or substantially so, and is internally provided with a spring 5a. This spring exerts sufficient force downwardly on lever 20 to hold it against its various pivots at all times. Changes in atmospheric pressure will equally affect the exteriors of each of bellows 5 and 6 and therefore balance each other out.

Since the effects of atmospheric pressure on the bellows 5 and 6 cancel each other, the net force produced by the bellows 5 and 6 on the beam 13 is a force which is a measure of the absolute pressure within the bellows 6.

The bellows 7 and 8 cooperate to produce a force on the beam 13 which is a measure of the rate of change of the pressure transmitted through the passage 58 to the interior of bellows 8. As illustrated hereinafter in Figure 9, the passage 58 may be connected to the exhaust manifold of an internal combustion engine. The interior of bellows 7 is provided with a spring 7a.

The exteriors of both bellows 7 and 8 are exposed to atmospheric pressure, so that the effect of atmospheric pressure on these two bellows cancels each other out. The interiors of the bellows 7 and 8 are connected through an orifice 59 in the fastening member 17 by which the two bellows are attached to the beam 14. A needle valve 62 carried by the fastening member 17 regulates the size of the orifice 59. The needle valve 62 may be adjusted by a screw 63 which may be reached by removing a plug 65 in the member and which closes the upper end of the bellows 7.

The orifice 59 delays the equalization of the pressures within the bellows 7 and 8. If the pressure supplied to the bellows 8 changes gradually, the orifice 59 permits the passage of fluid sufficient to allow the pressure within the bellows 7 to follow the variations in pressure within the bellows 8. Upon a sudden increase or decrease in pressure in the bellows 8 however, the fluid flow through the orifice 59 is not sufficiently rapid to equalize the pressures, and a pressure differential then exists between the interior of bellows 7 and the interior of bellows 8. This differential pressure causes a force to be exerted on the beam 13, which force is a measure of the rate of change of the pressure inside the bellows 8. If the pressure inside the bellows 8 is increasing, the force on the beam 13 acts upwardly, but if the pressure inside the bellows 8 decreases, the force on the beam 13 acts downwardly.

Although in illustrating the invention, I have shown an arrangement wherein the bellows 6 and 8 are connected to two different sources of pressure, it will be readily apparent that this mode of operation of my device is not necessary to my invention, but that both bellows 6 and 8 may be connected to the same source of pressure, where that mode of operation is desirable.

In my device, there are four resilient bellows, each of which has an appreciable spring rate. The term spring rate may be defined as the ratio between the force exerted on a flexible member to displace it from the position it tends to assume normally and the distance through which the flexible member is displaced by that force. Because of the use of four bellows in my device, it may be seen that the movable mechanical system of my device opposes a rather stiff resistance to a force tending to cause a movement thereof. In order to provide a more resilient system, I have provided means for compensating the spring rate on the four bellows. In other words, I have provided means which aids the force tending to deflect the bellows from their normal position.

This arrangement is best shown in Figure 2. There may be seen a bell-crank lever 60, pivotally mounted on a pin 61 carried by the bracket 54. A tension spring 62 is connected between one end of the lever 60 and a nut 64 carried by a screw 65a which passes through the plate 1. The opposite end of lever 60 carries an abutment 66 which is recessed for engagement by one end of a pin 68. The opposite end of pin 68 is engaged in a similar recess formed in an abutment 70 attached to the lever 20 by a rivet 71.

When the points of contact between the pin 68 and the abutments 66 and 70 are aligned with the pin 24 on which the lever 20 is pivoted, it will be seen that the tension of the spring 62 is opposed by a reaction force at the pin 24 extending in the direction of the lever 20. The tension of spring 62 does not then tend to rotate the lever 20 about its pivot 24.

As soon as the lever 20 moves upwardly or downwardly from the position shown in the drawing, under the influence of the bellows 5, 6, 7 and 8, the ends of the pin 68 are no longer aligned with the pivot pin 24 on which the lever 20 rotates. The spring 62 then exerts, through the pin 68, a force tending to move the lever 20 further away from the neutral position shown in the drawing. Therefore, the force required to move the lever 20 away from the neutral position in either direction is reduced, and the distance through which the lever is moved by a given force may be regulated by adjusting the tension in the spring 62. The distance through which the lever 20 and hence the slider 45 is moved by a given force supplied to the beam 13 may be termed the differential of the control instrument, and the screw 65 may be termed a differential adjusting screw. The reason for this terminology is that for any two given positions of the slider 45, there exists a definite differential between the forces produced by the bellows which cause the slider 45 to assume those two positions. By changing the tension in the spring 62, this force differential may be adjusted.

Referring now to Figure 9, there is shown an internal combustion engine 76 with an air induction and exhaust system, and a control system utilizing a device of the type disclosed in Figures 1 to 8, inclusive, to control the pressure of the air supplied to the intake manifold of the engine.

In the arrangement disclosed in Figure 9, air for supporting combustion in the engine 76 passes through an inlet 73 to a compressor or supercharger 72, whence it is discharged through a duct 71 into an aftercooler 74. The aftercooler 74 is provided to reduce the temperature of the compressed air, which is considerably increased because of the heat of compression. The air then passes through the carburetor 81, and intake manifold 82 to the engine 76. From the engine 76, the exhaust gases pass through an exhaust manifold 75, and thence either directly to the atmosphere through a waste gate 80 or through a turbine 77.

A throttle 83 in the carburetor 81 may be positioned by means of a lever 110, of suitable construction. The waste gate 80 is positioned by a motor 97 acting through a link 101. Power is supplied to control the motor 97 from an amplifier and power supply unit 84, which is disclosed in more detail in the co-pending Sparrow and Baak application previously mentioned. The amplifier 84 has a pair of input terminals 85 and 86, and serves to cause operation of motor 97 in one direction or the other, depending upon the phase of an alternating signal applied to the signal input terminals 85 and 86.

The signal potential applied to the input terminals 85 and 86 is the unbalance potential of an electrical network generally indicated at 91. The network 91 includes a resistance 46 over which a sliding contact 45 is moved in accordance with the resultant of the various pressure conditions acting on the bellows 5, 6, 7 and 8. The network 91 also includes a resistance 95 along which a slider 96 is moved by the waste gate motor 97. The interior of bellows 6 is connected through a conduit 70 to the duct 71, so that the bellows 6 responds to the pressure of the air discharged by the supercharger 72. The interior of bellows 8 is connected by a conduit 74 to the exhaust manifold 75, so that the bellows 7 and 8 move the beam 13 in accordance with the rate of change of the exhaust pressure.

The mechanism by which the bellows 5, 6, 7 and 8 move the slider 45 is shown very schematically in Figure 9, for the sake of simplification.

If the pressure in the conduit 70 decreases, the slider 45 is moved in a counter-clockwise direction, or upwardly along the resistance 46, and the network 91 is unbalanced in a direction so that the phase of the potential impressed on amplifier input terminals 85 and 86 causes motor 97 to drive the waste gate 80 towards closed position. This increases the proportion of the exhaust gases which are directed through the turbine, thereby increasing the turbine speed and hence increasing the compression ratio of the supercharger and changing the discharge pressure of the supercharger back toward its original value. If, on the other hand, the discharge pressure of the supercharger increases, the slider 45 is moved clockwise, or downwardly along resistance 46, thereby unbalancing the network 91 in a direction so that the motor 97 moves the waste gate 80 toward open position thereby reducing the speed of the turbine 71 and the supercharger 73, and restoring the pressure in the discharge of the supercharger to its original value.

Because of the inherent lag in the system between the exhaust manifold 75 and the conduit 71 to which the interior of bellows 6 is connected, it is desirable to utilize the rate of change of the pressure in the exhaust manifold so as to obtain a compensating or anticipating effect in the control system. In other words, there is quite a time delay between a change in the position of the waste gate 80 and the time when the pressure in the duct 71 reaches a substantially constant value corresponding to the new position of the waste gate 80. This time delay is due to the time required to accelerate the supercharger. If means were not provided to compensate the system for this time delay, the bellows 6 would continue to call for increased pressure from the compressor 72 at a time when the waste gate 80 had already reached a position which would eventually cause the supercharger discharge pressure to assume the required value. This would result in an overshooting of the waste gate, to a position beyond that which would cause the compressor discharge pressure to reach the desired value, and the compressor discharge pressure would then continuously hunt about the desired value, first increasing and then decreasing with respect to that value without ever remaining substantially constant. The use of the bellows 7 and 8 to compensate the system for the rate of change of the exhaust pressure prevents the establishment of such an overshooting or hunting condition. For example, if the pressure in the duct 71 decreases, thereby resulting in a counter-clockwise movement of slider 45, the waste gate is moved towards closed position by the control system. As soon as the waste gate moves towards closed position, the pressure of the exhaust gases increases rapidly, thereby causing the bellows 7 and 8 to exert an upward force on the beam 13, tending to bring the slider 45 back to its original position. The motion of the waste gate is thereby slowed down and stopped before the pressure in the duct 71 has been restored to the value which the system is set to maintain. As the force produced by the bellows 7 and 8 slowly dies away due to the equalization of their internal pressures through the orifice between these two bellows, the turbine and supercharger are accelerated by the increased pressure in the exhaust manifold and the pressure in the duct 71 is restored to the value it is desired to maintain. The slowly increasing force produced by the bellows 6 opposes the slow decrease in the force produced by the bellows 7 and 8, and the system becomes balanced again. An analogous operation takes place upon an increase in the pressure in the duct 71.

The control point of the network 91, or in other words the value of pressure in the duct 71 which the system will automatically maintain, may be adjusted by suitable means in the network 91, such as is disclosed in the copending Sparrow and Baak application previously referred to.

While I have shown and described a preferred embodiment of my invention, other modifications thereof will occur to those skilled in the art, and I therefore wish my invention to be limited only by the appended claims.

I claim as my invention:

1. A device of the character described, comprising, in combination, a pivotally mounted U-shaped lever, actuating means for moving said U-shaped lever, a pivotally mounted second lever, a connecting pin pivotally mounted between said U-shaped lever and said second lever, biasing means for pivoting said second lever so as to hold said pin in engaging relation with said U-shaped lever and said second lever, whereby upon positioning said U-shaped lever in a predetermined neutral position in relation to said pin said biasing means has no biasing effect upon said U-shaped lever, but when said U-shaped lever is pivotally positioned to either side of said neutral position by said actuating means said pin is positioned in such a manner as to cause said U-shaped lever to be increasingly biased away from said neutral position under force of said biasing means, and means operatively connected to said U-shaped lever and positioned thereby.

2. A device of the character described, comprising, in combination, a pair of supporting members, a first pair of bellows mounted between said supporting members, a second pair of bellows mounted between said supporting members, a movable plate positioned intermediate the bellows of each of said pairs of bellows, pressure connections whereby each of said pairs of bellows may be actuated in response to pressure conditions, a U-shaped lever spanning said plate and having arms operatively engaging the opposite ends of said plate whereby said lever may be actuated upon movement of said plate by said pairs of bellows in response to said pressure conditions, said lever being pivoted adjacent the points of engagement of said arms with said plate so as to restrain tilting of said plate, and means actuated by said lever upon movement thereof.

3. Control apparatus, comprising in combination, control means to be operated in accordance with the resultant of a plurality of variable conditions, a U-shaped lever for operating said control means, a translatable beam spanning said lever and engaging both arms thereof, and a plurality of devices for applying parallel forces to said beam at longitudinally spaced points thereon, each said device being responsive to one of said conditions.

4. Control apparatus, comprising in combination, a pair of spaced supporting plates, a shaft extending parallel to and between said plates to be rotated in accordance with the variations of a variable condition, a pulley on said shaft, a first lever rotatable about an axis parallel to said shaft, means responsive to said variable condition for rotating said lever about said axis, a second lever rotatable about another axis parallel to said shaft, a flexible tape fastened to said first and second levers and passing over said pulley, and spring means extending between said second lever and one of said plates for maintaining said tape under tension.

5. Electrical apparatus for controlling the pressure of the air supplied to the intake manifold of an internal combustion engine provided with a compressor driven by a turbine powered with exhaust gases from said engine, comprising in combination, means for controlling the compression ratio of said compressor, electrical motor means for driving said compression ratio controlling means, means including an electrical impedance network for controlling said motor means, variable impedance means connected in said network, said network being effective to control said motor in accordance with the variations of said impedance, means responsive to the pressure of the air discharged by said compressor for producing a force varying in magnitude with said pressure, means responsive to the rate of change of the pressure of said exhaust gases for producing a force varying in magnitude with said rate, and mechanical means for combining said forces to produce a resultant force and to vary said impedance means proportional to said resultant force.

6. Electrical apparatus for controlling the pressure of the air supplied to the intake manifold of an internal combustion engine provided with a compressor driven by a turbine powered with exhaust gases from said engine, comprising in combination, means for controlling the compression ratio of said compressor, electrical motor means for driving said compression ratio controlling means, a normally balanced electrical network, first variable impedance means connected in said network, means responsive to the pressure of the air discharged by said compressor for producing a force varying in magnitude with said pressure, means responsive to the rate of change of the pressure of said exhaust gases for producing a force varying in magnitude with said rate, mechanical means for combining said forces to produce a resultant force and to vary said first impedance means in accordance with said resultant force, said first impedance means being effective upon variation thereof to unbalance said network, means responsive to unbalance of said network for controlling said motor means, and second variable impedance means operated by said motor means for rebalancing said network.

7. A device of the character described comprising, in combination, support means, a relatively long translatable beam, two force exerting means for applying parallel forces to said beam at longitudinally spaced points thereon, each said force exerting means including a pair of devices engaging said support means and acting in opposition to each other on said beam, at least one device of each pair being a bellows responsive to a pressure condition, and means for causing the movement of said beam produced by a variation in the forces exerted by said force exerting means to always take place only in a direction parallel to the direction of said forces said last named means comprising a rigid lever pivotally connected to said beam at two longitudinally spaced points of the latter and pivotally mounted to said support means in such a manner as to prevent pivotal movement of the beam about its transverse axis perpendicular to the direction of said force.

8. Electrical apparatus for controlling the pressure of the air supplied to the intake manifold of an engine having a combustion chamber and provided with a turbosupercharger powered with exhaust gases from said combustion chamber comprising in combination; means for controlling the compression ratio of said turbosupercharger, electrical motor means for driving said compression ratio controlling means, a balanceable electrical impedance network, a variable impedance means connected in said network, said network being effective to control said motor in accordance with the extent and direction of unbalance of the network, means responsive to a pressure appurtenant to an operating condition of the turbosupercharger for producing a force varying in magnitude with said pressure, means responsive to the rate of change of a pressure appurtenant to an operating condition of the turbosupercharger for producing a force varying in magnitude with said rate, mechanical means for combining said forces to produce a resultant force and to vary said impedance means in accordance with said resultant force, and follow up means driven by said motor for rebalancing said impedance network.

ALBERT E. BAAK.

REFERENCES CITED

The following references are of record in the file of this patent:

UNITED STATES PATENTS

| Number | Name | Date |
| --- | --- | --- |
| 766,820 | Fulton | Aug. 9, 1904 |
| 1,091,044 | Delzell | Mar. 24, 1914 |
| 1,186,180 | Fulton | June 6, 1916 |
| 1,459,218 | Knaak | June 19, 1923 |
| 1,998,136 | Jaenichen et al. | Apr. 16, 1935 |
| 2,005,773 | De Florez | June 25, 1935 |
| 2,027,275 | Foster | Jan. 7, 1936 |
| 2,030,386 | Miller | Feb. 11, 1936 |
| 2,149,216 | Gravley | Feb. 28, 1939 |
| 2,274,254 | Newton | Feb. 24, 1942 |
| 2,285,540 | Stein | June 9, 1942 |
| 2,358,363 | Truesdell | Sept. 19, 1944 |
| 2,374,708 | Shoults | May 1, 1945 |

FOREIGN PATENTS

| Number | Country | Date |
| --- | --- | --- |
| 434,289 | Great Britain | Aug. 29, 1935 |